(12) United States Patent
Pogrebinsky

(10) Patent No.: US 11,265,207 B2
(45) Date of Patent: *Mar. 1, 2022

(54) DISASTER RECOVERY OF CLOUD RESOURCES

(71) Applicant: Microsoft Technology Licensing, LLC, Redmond, WA (US)

(72) Inventor: Vladimir Pogrebinsky, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/096,878

(22) Filed: Nov. 12, 2020

(65) Prior Publication Data
US 2021/0067402 A1   Mar. 4, 2021

Related U.S. Application Data

(63) Continuation of application No. 15/136,111, filed on Apr. 22, 2016, now Pat. No. 10,841,148.
(Continued)

(51) Int. Cl.
*H04L 12/24*     (2006.01)
*H04L 41/0654*   (2022.01)
(Continued)

(52) U.S. Cl.
CPC ...... *H04L 41/0654* (2013.01); *G06F 11/1438* (2013.01); *G06F 11/1471* (2013.01);
(Continued)

(58) Field of Classification Search
CPC ............. G06F 11/1438; G06F 11/1471; G06F 11/1482; G06F 11/1658; G06F 11/2025;
(Continued)

(56) References Cited

U.S. PATENT DOCUMENTS 6,154,847 A  * 11/2000 Schofield ............ G06F 11/1471
                                                       714/20
2012/0137001 A1 * 5/2012 Ferris ...................... H04W 4/60
                                                       709/226
(Continued)

FOREIGN PATENT DOCUMENTS

CN         1716212 A       1/2006
CN         1779650 A       5/2006
(Continued)

OTHER PUBLICATIONS

"First Office Action and Search Report Issued in China Patent Application No. 201680072697.0", dated May 8, 2021, 27 Pages.

*Primary Examiner* — Gil H. Lee
(74) *Attorney, Agent, or Firm* — Buckley, Maschoff & Talwalkar LLC

(57) ABSTRACT

Embodiments of the present invention are directed to methods by which different services registered with cloud infrastructure may recover in case of disaster. Also directs procedures with which a resource provider may recover and rebuild its cloud resource information by scanning actual resources available. A resource provider will synchronize resources with a central service to get updated consumer and subscription information. In the scenario in which a central service fails and is recovered from backup, the central service should synchronize with resource providers to update its resource information.

20 Claims, 8 Drawing Sheets

Related U.S. Application Data

(60) Provisional application No. 62/266,673, filed on Dec. 13, 2015.

(51) Int. Cl.
*H04L 67/1095* (2022.01)
*G06F 11/14* (2006.01)
*G06F 11/16* (2006.01)
*G06F 11/20* (2006.01)

(52) U.S. Cl.
CPC ...... *G06F 11/1482* (2013.01); *G06F 11/1658* (2013.01); *G06F 11/2025* (2013.01); *G06F 11/2097* (2013.01); *H04L 67/1095* (2013.01)

(58) Field of Classification Search
CPC ............ G06F 11/2097; H04L 41/0654; H04L 67/1095
See application file for complete search history.

(56) References Cited

U.S. PATENT DOCUMENTS

| | | | | |
|---|---|---|---|---|
| 2012/0203742 | A1* | 8/2012 | Goodman | G06F 16/122 707/646 |
| 2015/0006733 | A1* | 1/2015 | Khan | H04L 47/829 709/226 |
| 2015/0269511 | A1* | 9/2015 | Busayarat | G06Q 30/04 705/7.25 |
| 2015/0363288 | A1* | 12/2015 | Frick | G06F 1/28 714/6.3 |
| 2015/0370922 | A1* | 12/2015 | Helfman | G06Q 20/02 705/40 |
| 2016/0092308 | A1* | 3/2016 | Bates | G06F 11/142 714/4.11 |
| 2016/0246677 | A1* | 8/2016 | Sangamkar | G06F 9/5038 |

FOREIGN PATENT DOCUMENTS

| | | |
|---|---|---|
| CN | 103547994 A | 1/2014 |
| CN | 103703724 B | 6/2015 |

* cited by examiner

DISASTER RECOVERY OF CLOUD RESOURCES

CROSS-REFERENCE TO RELATED APPLICATIONS

This application is a continuation of U.S. patent application Ser. No. 15/136,111 (the '111 application) filed Apr. 22, 2016. The '111 application claims the benefit of U.S. Provisional Patent Application No. 62/266,673, filed Dec. 13, 2015. Each of the aforementioned applications is expressly incorporated herein in its entirety.

BACKGROUND

Cloud computing provides access to a wide range of services. These services range from processing, server, storage, network, applications and online services. These services allow cloud consumers to rapidly provision, manage and release resources on demand with little management effort and without service provider interaction. Providers advertise a set of services as a package bundle—often referred to as "plans" or "offers." Cloud consumers subscribe to these package bundles to get a system-wide entity called a subscription that provides consumer access to all advertised services. Once a subscription is acquired, then the consumers can create resources using these different services.

Cloud infrastructure consists of a set of services registered by a service provider during initial setup. The set of services gets up-dated (e.g., added and removed) over time. These cloud infrastructure services are of different types ranging from services required to monitor, run and manage cloud infrastructure (often call "system services") to services directly used by the cloud consumers to create their own resources (often called "resource providers"). There is a central service that manages all of these registered services. This central service is like a master service that provides centralized management of cloud infrastructure and resource access. All cloud infrastructure services register with the central service, and the central service decides routing of cloud consumer requests to relevant resource provider services.

There can be scenarios in which one or more service goes down because of software, hardware or network failures. If the central service goes down, then whole system fails to respond to cloud consumer requests and becomes unavailable. If one of the resource providers goes down, then cloud consumers and service provider will not able to manage and create resources on that failed cloud service. If system service fails, then cloud system functionality is impacted, and the cloud system may be unusable.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the present invention are directed to methods by which different services registered with cloud infrastructure may recover in case of disaster. Also directs procedures with which a resource provider may recover and rebuild its cloud resource information by scanning actual resources available. A resource provider will synchronize resources with a central service to get updated consumer and subscription information. In the scenario in which a central service fails and is recovered from backup, the central service should synchronize with resource providers to update its resource information.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
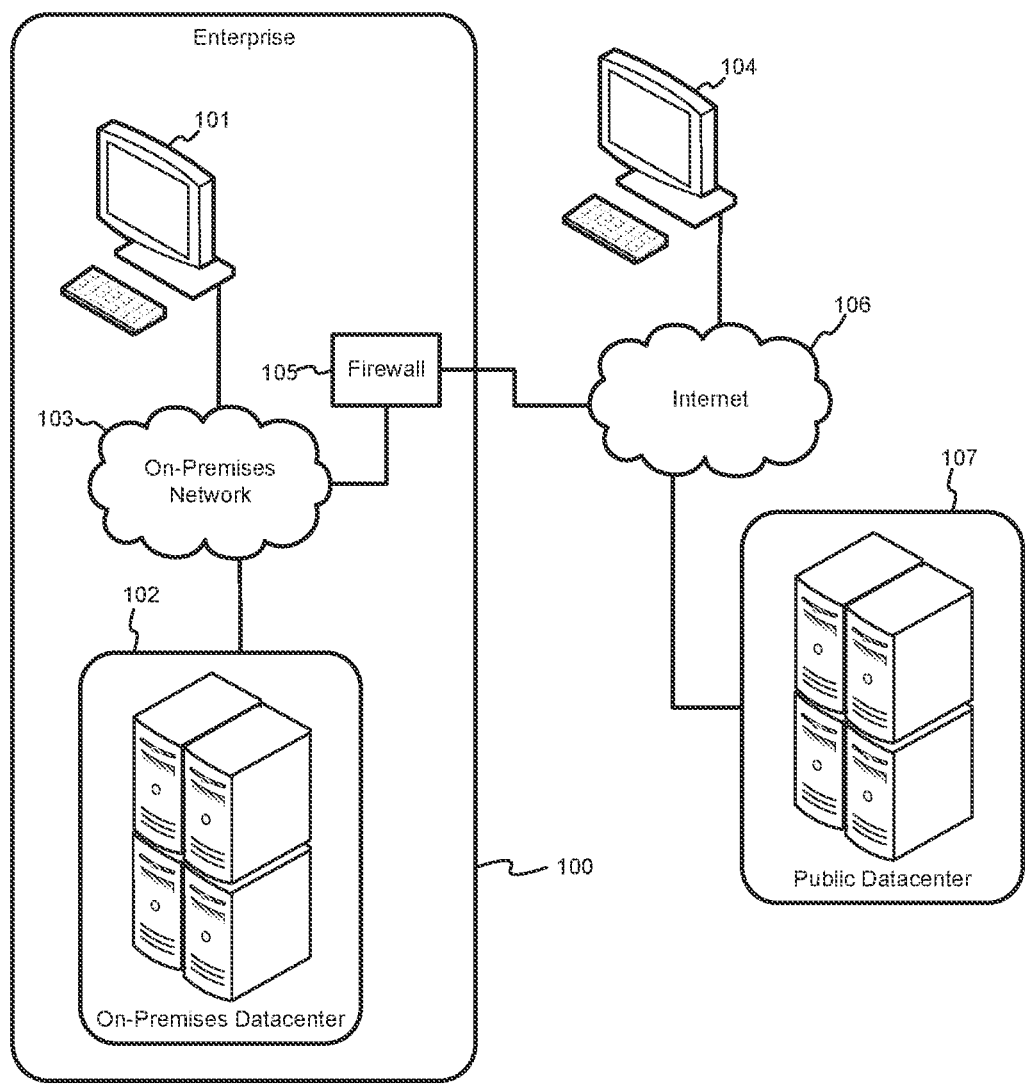
FIG. 1 is a high level block diagram of a system that provides enterprise users with access to local, on-premises resources and to remote or public resources.

FIG. 1 is a high level block diagram of a system that provides enterprise users with access to local, on-premises resources and to remote or public resources. Local enterprise terminal 101 allows users to directly access on-premises datacenter (private cloud) 102 via on-premises network 103. Users located outside enterprise 100 may access on-premises datacenter 102 using remote terminal 104. Terminals 101 and 104 may be, for example, a desktop, laptop, notebook, or tablet computer. Other devices, such as dedicated terminals, smartphones, personal digital assistants (PDA), etc. may also be used as terminals 101 and 104.

Firewall 105 provides network security system for enterprise 100 and controls incoming and outgoing network traffic. External terminal 104 may connect to enterprise on-premises network 103 via Internet 106 or any public or private network. Firewall 105 allows terminal 104 to access on-premises datacenter 102 if terminal 104 provides the appropriate credentials and authentication. Enterprise users at terminals 101 and 104 may also access public datacenter (public cloud) 107 via Internet 106.

On-premises datacenter 102 and public datacenter 107 may provide "cloud computing" services to enterprise 100 and other users. By freeing enterprise users from managing information technology (IT) infrastructure, cloud computing provides virtually limitless compute, storage, and network resources at low cost, while allowing services to scale on demand.

Figure 2:
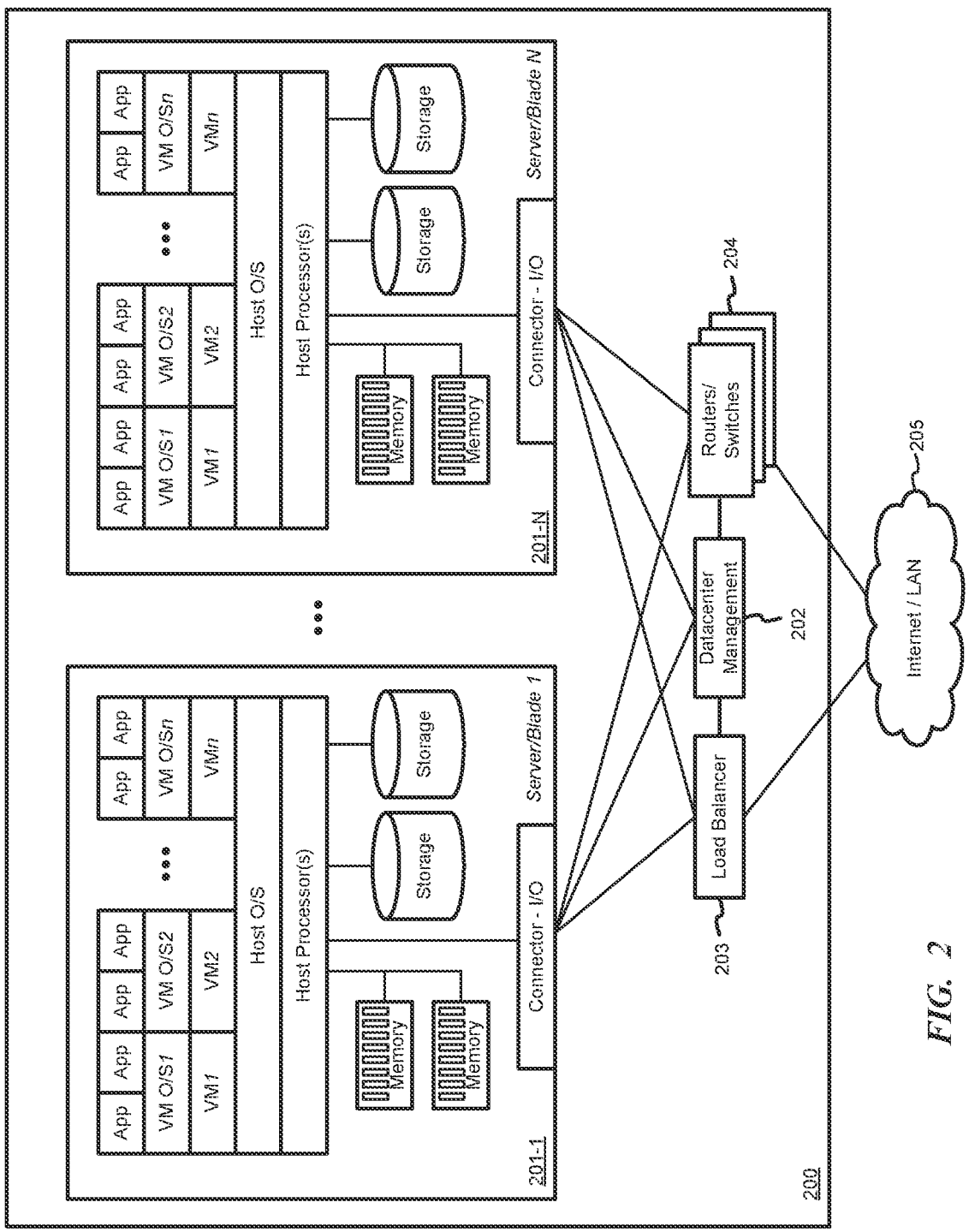
FIG. 2 is a block diagram of a datacenter that provides cloud computing services or distributed computing services according to one embodiment.

FIG. 2 is a block diagram of a distributed computing network or datacenter 200 that provides cloud computing services or distributed computing services according to one embodiment. A plurality of servers 201 are managed by datacenter management controller 202. Load balancer 203 distributes requests and workloads over servers 201 to avoid a situation where a single server 201 becomes overwhelmed and to maximize available capacity and performance of the resources in datacenter 200. Routers/switches 204 support data traffic between servers 201 and between datacenter 200 and external resources and users via external network 205, which may be a local area network (LAN) in the case of an enterprise, on-premises datacenter 102 or the Internet in the case of a public datacenter (107).

Servers 201 may be traditional standalone computing devices and/or they may be configured as individual blades in a rack of many server devices. Servers 201 have an input/output (I/O) connector that manages communication with other database entities. One or more host processors on each server 201 run a host operating system (O/S) that supports multiple virtual machines (VM). Each VM may run its own O/S so that each VM O/S on a server is different, or the same, or a mix of both. The VM O/S' s may be, for example, different versions of the same O/S (e.g., different VMs running different current and legacy versions of the Windows® operating system). In addition, or alternatively, the VM O/S's may be provided by different manufacturers (e.g., some VMs running the Windows® operating system, while others VMs run the Linux® operating system). Each VM may then run one or more applications (App). Each server also includes storage (e.g., hard disk drives (HDD)) and memory (e.g., RAM) that can be accessed and used by the host processors and VMs.

Cloud computing is the delivery of computing capabilities as a service, making access to IT resources like compute power, networking and storage as available as water from a faucet. As with any utility, you generally only pay for what you use with cloud computing. By tapping into cloud services, users can harness the power of massive data centers without having to build, manage or maintain costly, complex IT building blocks. With the cloud, much of the complexity of IT is abstracted away, letting you focus just on the infrastructure, data and application development that really matter to your business.

Datacenter 200 provides pooled resources on which customers or tenants can dynamically provision and scale applications as needed without having to add more servers or additional networking. This allows tenants to obtain the computing resources they need without having to procure, provision, and manage infrastructure on a per-application, ad-hoc basis. A cloud computing datacenter 200 allows tenants to scale up or scale down resources dynamically to meet the current needs of their business. Additionally, a datacenter operator can provide usage-based services to tenants so that they pay for only the resources they use, when they need to use them. For example, a tenant may initially use one VM on server 201-1 to run their applications. When demand increases, the datacenter may activate additional VMs on the same server and/or on a new server 201-N as needed. These additional VMs can be deactivated if demand later drops.

Datacenter 200 may offer guaranteed availability, disaster recovery, and back-up services. For example, the datacenter may designate one VM on server 201-1 as the primary location for the tenant's application and may activate a second VM on the same or different server as a standby or back-up in case the first VM or server 201-1 fails. Database manager 202 automatically shifts incoming user requests from the primary VM to the back-up VM without requiring tenant intervention. Although datacenter 200 is illustrated as a single location, it will be understood that servers 201 may be distributed to multiple locations across the globe to provide additional redundancy and disaster recovery capabilities.

The datacenter operator may offer different levels of cloud computing services to tenants. With an Infrastructure-as-a-Service (IaaS) offering, the lower levels of the IT stack are delivered as a service, which frees up developers from much of the complexity of provisioning physical machines and configuring networks. With IaaS, tenants can easily provision virtual machines in a highly scalable and available cloud environment, develop and test solutions, then deploy applications to production. With a Platform-as-a-Service (PaaS) offering, everything from network connectivity through the runtime is provided. PaaS makes development easy by providing additional support for application services and management of the operating system, including updates. With PaaS, tenants can focus on the business logic of application and quickly move applications from concept to launch. With a Software-as-a-Service (SaaS) offering, a single finished application or suite of applications can be delivered to customers through a web browser, thereby eliminating their need to manage the underlying components of the IT stack including application code.

Referring again to FIG. 1, an enterprise may use a public datacenter or public cloud computing services to take advantage of cost savings, reduced management requirements, or particular services offered. On the other hand, the enterprise may also use an on-premises datacenter or private cloud services to ensure data security or to use a proprietary application, for example. It will be understood that an enterprise does not have to use an on-premises datacenter to take advantage of private cloud services. Instead, private cloud services may be provided by a datacenter that limits access to the enterprise. The use of both public cloud services and private cloud services by an enterprise is referred to generally as a hybrid cloud.

Figure 3:
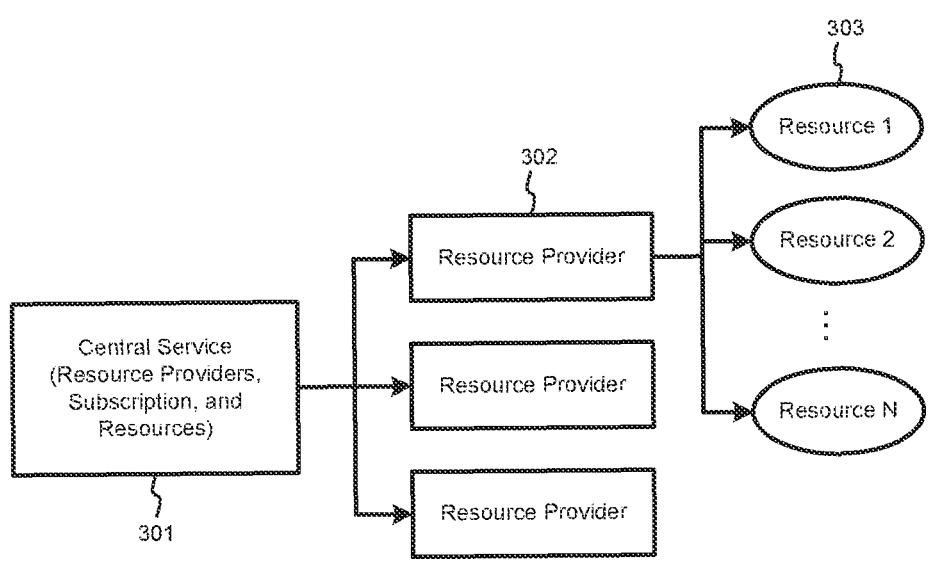
FIG. 3 illustrates communication connection between central service and resource providers.

FIG. 3 illustrates communication connections between central service 301 and resource providers 302. The central service 301 acts as master and manages a list of resource providers 302, consumer subscriptions, and their resources 303. Central service 301 keeps track of resource provider registrations and subscription management. Central service 301 is the master for subscriptions. Each resource provider 302 registers with central service 301 and enables consumers to create certain types of resources 303. Resource provider 302 creates actual resources 303 on behalf of consumers and maintains metadata about the resource 303. Resource provider 302 acts as master for resources 303. Resources 303 denote the actual resources (such as websites, databases, storage, etc.) that consumers create on the cloud infrastructure.

Figure 4:
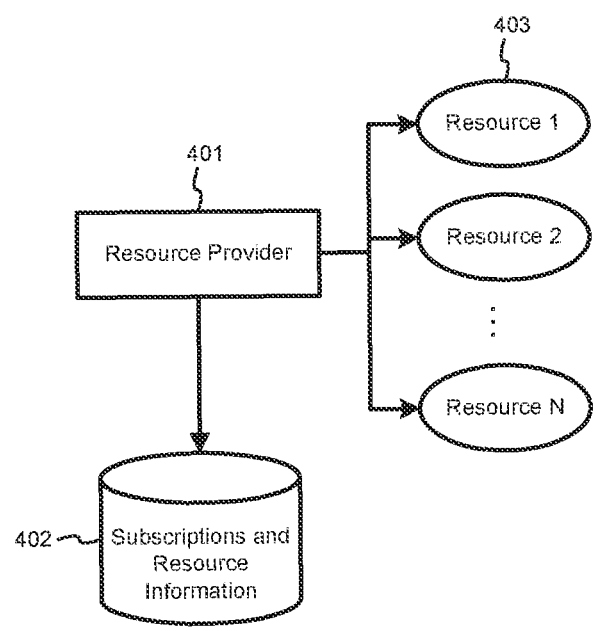
FIG. 4 illustrates a resource provider domain where it is responsible for tracking and managing resource information.

FIG. 4 illustrates a resource provider domain wherein the resource provider 401 is responsible for tracking and managing resource information. Resource provider 401 keeps track of consumer subscriptions. Resource provider 401 also creates and maintains the actual resources 403 on behalf of consumers. Resource provider 401 keeps information about consumer access in the form of subscriptions 402. Resource consumption limits are also defined in the subscription in the form of quotas. Resource provider 401 also keeps track of actual resources 403 and resource metadata. Resource provider 401 tags actual resources 403 or names the resources 403 in such a manner that a metadata record of the actual resource can be re-created from that information. Accordingly, during a recovery process, resource provider 401 will re-generate metadata by scanning existing resources 403.

Figure 5:
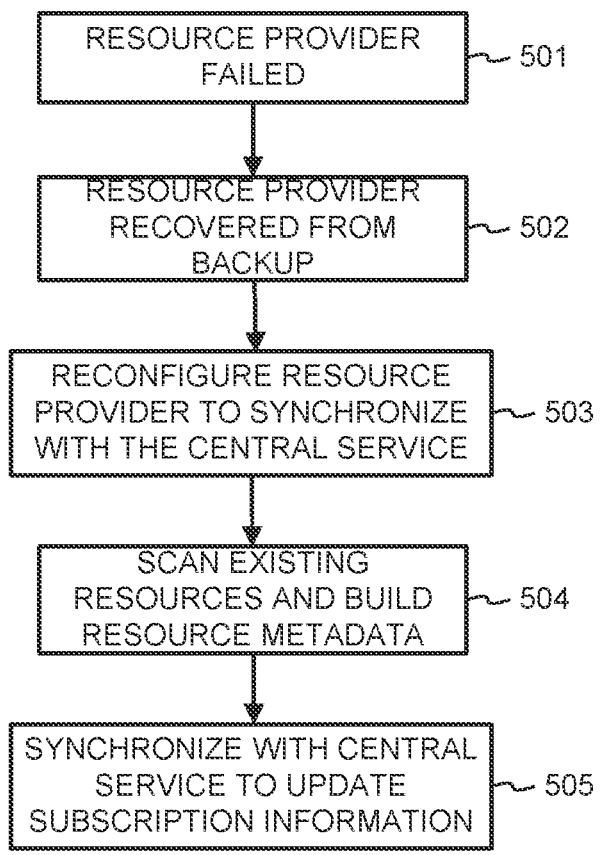
FIG. 5 illustrates a sequence of steps for disaster recovery for a resource provider.

FIG. 5 illustrates a sequence of steps for disaster recovery for a resource provider. Recovery scenarios may depend on the location of actual resources and the central service. In step 501, a resource provider has failed. There are many reasons why any cloud service may fail, such as due to hardware, network, communication link, or software failures. In step 502, once the resource provider is restored back from backup. At that point, the resource provider will need to rebuild its metadata store. In step 503, a service provider reconfigures the resource provider to perform the recovery process and to synchronize with the central service.

In step 504, the resource provider will start scanning actual resources to build resource metadata. The resource metadata will be created with consumer subscriptions so it provides consumers access to them. If metadata discovery and recovery cause any business rule violations, then those metadata records are marked appropriately so that the service provider can take manual action for recovery.

In step 505, the resource provider synchronizes with central service to update consumer subscription information. It will update subscription information in the metadata store. Any record which seems conflicting with business rules will be marked fail to recover.

Figure 6:
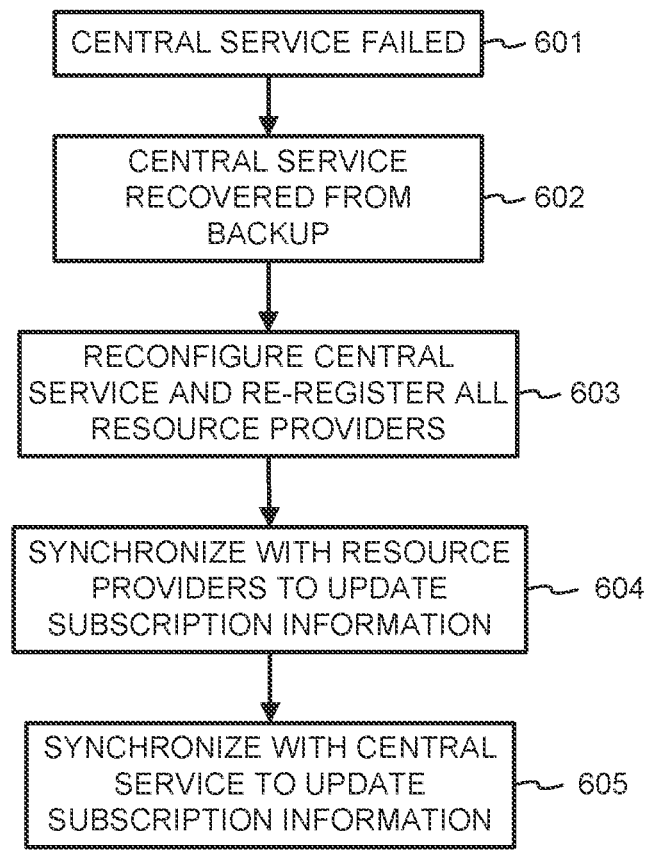
FIG. 6 illustrates a sequence of steps for disaster recovery for central system.

FIG. 6 illustrates a sequence of steps for disaster recovery for the central service. The recovery process depends upon underlying resource providers. In step 601, a central service failure is detected. In step 602, the central system is restored back from backup. In step 603, the service provider reconfigures the central service with the latest settings to ensure all latest configuration applies. The service provider re-registers all resource providers so that they are pointing to latest endpoints and validate that the central service is able to communicate with the resource providers.

The central system will then need to update its consumer subscription information. In step 604, the central service synchronizes with the resource providers, and each resource provider provides a list of consumer subscriptions known to them. Based on the available information, the central system needs to either update the subscriptions or create new offerings (i.e., plans and offers) and associate discovered subscriptions with the offerings. These subscriptions and offering are marked in such a manner that the service provider can review them later on and can take manual action.

Central system needs to track resources owned by consumers. In step 605, the central system synchronizes with each registered resource provider to update its resource metadata information. If there is any conflict during metadata recovery, then that record will be flagged for service provider review.

In one embodiment, one or more computer storage media having computer-executable instructions embodied thereon that, when executed, perform a method for recovering from disaster within a cloud-computing infrastructure. In the method, a tenant acquires a subscription from a service provider. The tenant uses the subscription to create resources on a resource provider. The resource provider will create resources and tag them with specific information which helps in uniquely identifying resource and also enable resource provider to determine who owns this resource. This information will be used by resource provider during disaster recovery for re-creating its resource metadata records by scanning real resources and information tagged from those resources. This tagging is required for a successful disaster recovery when resource provider registry of resources needs to be recovered.

Resource providers may maintain a list of consumer subscriptions and resources created by consumers. Each resource providers will expose the list of consumer subscriptions that have access to that resource provider. The resource provider will also provide a list of resources owned by each consumer subscription. A central service will use subscriptions and resource information during its recovery to rebuild its subscriptions and resource metadata information. Recovered resources and subscriptions can be tagged for subsequent review.

A central service will synchronize with resource providers to update its resource and subscription information. Once the central service recovers from failure, then the service provider may reconfigure the central service and ensure that resource provider information is the latest version. The central service seeks out all registered resource providers to synchronize tenant subscriptions and resources. The resource provider exposes resources and subscription information. The central service may tag recovered resources in such a manner so service provider and tenants can review them.

There are two ways that the system may be out-of-sync:

(1) A centralized service has information that a resource provider does not have. The centralized service creates missing subscriptions and synchronizes them, which will result in deletion (or marking for deletion) of any extra information about resources that are missing in the resource provider.

(2) A resource provider has information about a subscription that centralized service does not have. The centralized service recreates records about this subscription to further facilitate troubleshooting or clean deletion.

If neither the resource provider nor centralized service have information about the subscription, then its traces may be lost. There is still a chance that information about such a subscription exists in auxiliary services (such as, monitoring, logging, billing, etc.) and similar synchronization may need to be performed.

The central service may need to be synchronized with other services that sit "above" it, such as a billing system that approves subscription creation. The process for such synchronization is similar to what is described above. The subscriptions that are not in the billing system are suspended or marked for review/deletion. Subscriptions that are in the centralized service, but not in the billing system, are also suspended and manual information is required to repair them.

When critical information about a subscription is missing, and it is not possible to recover it automatically (e.g., when owner or offer information is missing), a manual recovery may be needed:

For subscription recovery—a new subscription may need to be created.

For resource recovery—a resource from a recovered subscription may need to be moved to a newly recreated subscription upon verification of resource ownership.

Figure 7:
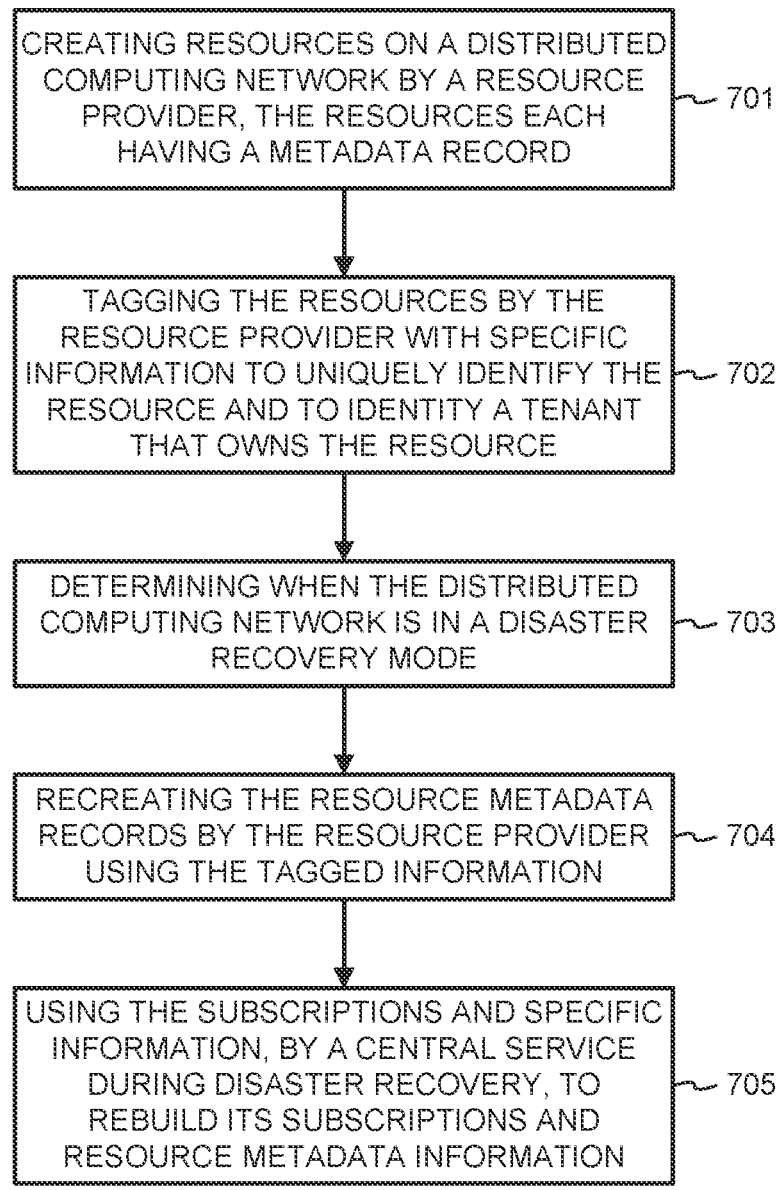
FIG. 7 is a flow chart illustrating an example method for recovering from a disaster or failure within a cloud-computing infrastructure.

FIG. 7 is a flow chart illustrating an example method for recovering from a disaster or failure within a cloud-computing infrastructure. In step 701, resources are created on a distributed computing network by a resource provider. The resources each have a metadata record. In step 702, the resources are tagged by the resource provider with specific information to uniquely identify the resource and to identity a tenant that owns the resource. In step 703, the distributed computing network determines that it needs to enter a disaster recovery mode, such as when a software, hardware or network failure occurs.

In step 704, the resource metadata records are recreated by the resource provider using the tagged information. In step 705, during disaster recovery, the subscriptions and specific information are used by a central service to rebuild its subscriptions and resource metadata information.

The resource provider may maintain a list of consumer subscriptions and resources created by consumers. The resource provider may expose a list of consumer subscriptions that have access to the resource provider. The resource provider may provide a list of resources owned by each consumer subscription.

Figure 8:
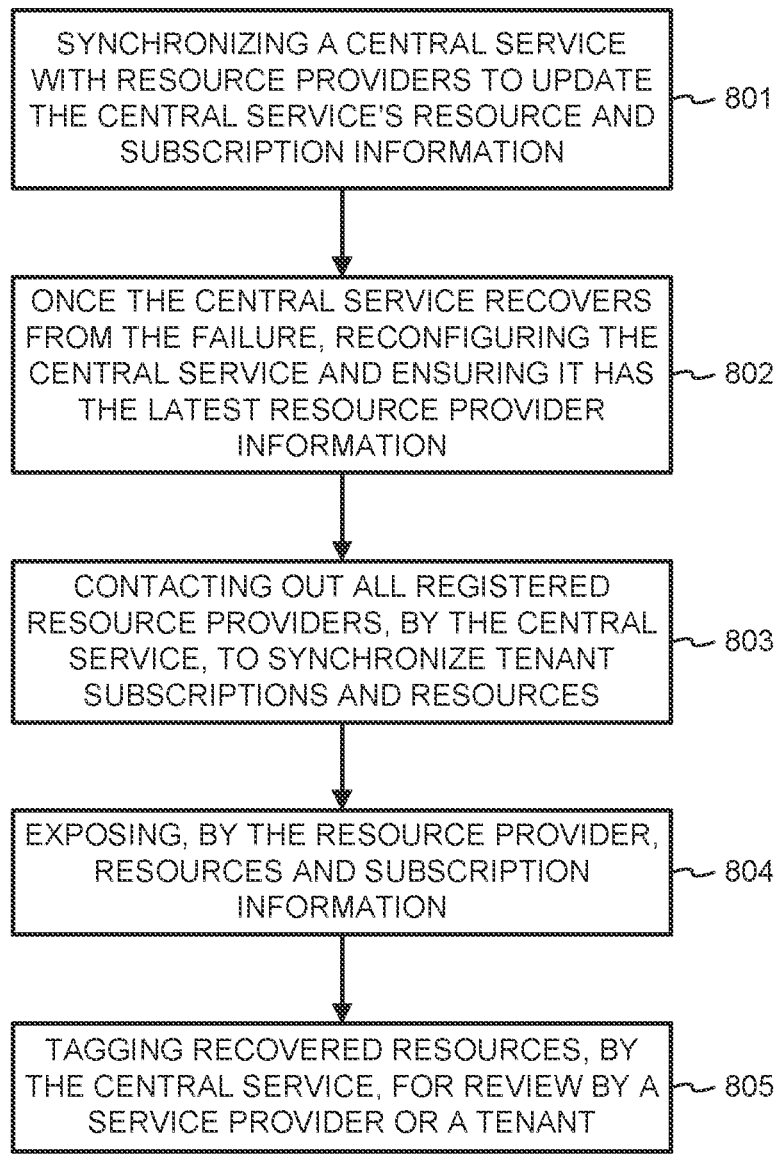
FIG. 8 is a flow chart illustrating an example method for recovering from a failure within a distributed computer network.

FIG. 8 is a flow chart illustrating an example method for recovering from a failure within a distributed computer network. In step 801, a central service synchronizes with resource providers to update the central service's resource and subscription information. In step 802, once the central service recovers from the failure, the central service is reconfigured to ensure it has the latest resource provider information. In step 803, all registered resource providers are contacted by the central service to synchronize tenant subscriptions and resources.

In step 804, the resource provider exposes resources and subscription information. In step 805, the central service tags recovered resources for review by a service provider or a tenant.

During disaster recover, the central service may be synchronized with other services, such as a billing system that approves subscription creation. Subscriptions that are not in the billing system may be suspended in the recovered system. When information about a subscription is missing and the information is not possible to be automatically recovered, a service provider may be contacted or requested to initiate a manual recovery. The manual recovery may require creating a new subscription. The manual recovery may require moving a resource from a recovered subscription to a newly recreated subscription upon verification of resource ownership.

An example computer-implemented method for recovering from disaster within a cloud-computing infrastructure comprises creating resources on a distributed computing network by a resource provider, the resources each having a metadata record; tagging the resources by the resource provider with specific information to uniquely identify the resource and to identity a tenant that owns the resource; determining when the distributed computing network is in a disaster recovery mode; and recreating the resource metadata records by the resource provider using the tagged information.

Additional embodiments of the method further comprise maintaining, by the resource provider, a list of consumer subscriptions and resources created by consumers.

Additional embodiments of the method further comprise exposing, by the resource provider, a list of consumer subscriptions that have access to the resource provider.

Additional embodiments of the method further comprise providing, by the resource provider, a list of resources owned by each consumer subscription.

Additional embodiments of the method further comprise using the subscriptions and specific information, by a central service during disaster recovery, to rebuild its subscriptions and resource metadata information.

Another example computer-implemented method for recovering from a failure within a distributed computer network comprises synchronizing a central service with resource providers to update the central service's resource and subscription information; once the central service recovers from the failure, reconfiguring the central service and ensuring it has the latest resource provider information; contacting all registered resource providers, by the central service, to synchronize tenant subscriptions and resources; exposing, by the resource provider, resources and subscription information; and tagging recovered resources, by the central service, for review by a service provide or a tenant.

Additional embodiments of the method further comprise synchronizing the central service with other services.

In other embodiments of the method, the other services include a billing system that approves subscription creation.

Additional embodiments of the method further comprise suspending subscriptions that are not in the billing system.

In other embodiments of the method, when information about a subscription is missing and the information is not possible to be automatically recovered, requesting a service provider to initiate a manual recovery.

In other embodiments of the method, the manual recovery requires creating a new subscription.

In other embodiments of the method, the manual recovery requires moving a resource from a recovered subscription to a newly recreated subscription upon verification of resource ownership.

An example system comprises a distributed computing network executing a central service that manages user subscriptions and resource providers; a plurality of resource providers each configured to create resources as required by the user subscriptions, the resources each having a metadata record; the resources tagged by the resource provider with specific information to uniquely identify the resource and to identity a user that owns the resource, wherein during recovery from a failure of the distributed computing network the resource recreates the metadata records using the tagged information.

In additional embodiments of the system, the central service is synchronized with the resource providers to update resource and subscription information on the central service.

In additional embodiments of the system, once the central service recovers from the failure, the central service contacts all registered resource providers to synchronize tenant subscriptions and resources.

In additional embodiments of the system, the resource provider exposes resources and subscription information.

In additional embodiments of the system, the central service tags recovered resources for review by a service provide or a tenant.

In additional embodiments of the system, during the failure recovery, the central service is synchronized with a billing system that approves subscription creation.

Additional embodiments of the system comprise a data store comprising user subscription and resource information.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for recovering from a failure of a resource provider within a distributed computer network, the method being performed by the resource provider, the method comprising:
   registering the resource provider with a central service;
   associating resources on the distributed computer network with specific information that uniquely identifies the resources and enables the resource provider to determine resource owners; and
   in response to the failure of the resource provider:
      scanning the resources and the specific information that is associated with the resources;
      recreating metadata records in a metadata store based at least in part on the specific information, wherein the metadata records and the specific information are different;
      synchronizing the resources with the central service to obtain updated subscription information from the central service; and
      updating subscription information in the metadata records based at least in part on the updated subscription information obtained from the central service.

2. The method of claim 1, wherein the specific information that is associated with a particular resource enables a metadata record corresponding to the particular resource to be recreated.

3. The method of claim 1, further comprising:
   detecting that at least one recreated metadata record violates a business rule; and
   marking the at least one recreated metadata record for manual action.

4. The method of claim 1, further comprising exposing, to the central service, consumer subscriptions that have access to the resource provider and one or more resources owned by each consumer subscription.

5. The method of claim 1, further comprising restoring the resource provider from a backup in response to the failure of the resource provider.

6. The method of claim 1, further comprising:
   creating the resources on behalf of consumers; and
   maintaining metadata about the resources.

7. A method for recovering from a failure of a central service within a distributed computer network, the method being performed by the central service, the method comprising:
   re-registering a plurality of resource providers, wherein the plurality of resource providers enable consumers to create resources, and wherein the plurality of resource providers are previously registered with the central service prior to the failure of the central service;
   receiving resource information and subscription information from the plurality of resource providers;
   recreating metadata records associated with the resources during recovery of the central service using the resource information and the subscription information received from the plurality of resource providers, wherein the metadata records are different from the resource information and the subscription information; and
   routing, by the central service, cloud consumer requests to the plurality of resource providers that have re-registered with the central service.

8. The method of claim 7, further comprising synchronizing the metadata records at the central service with corresponding metadata records maintained by the plurality of resource providers.

9. The method of claim 7, further comprising validating that the central service is able to communicate with the plurality of resource providers.

10. The method of claim 7, further comprising restoring the central service from a backup in response to the failure of the central service.

11. The method of claim 7, further comprising requesting a service provider to initiate a manual recovery when information about a subscription is missing and the information cannot be automatically recovered.

12. The method of claim 11, wherein the manual recovery requires creating a new subscription.

13. The method of claim 11, wherein the manual recovery requires moving a resource from a recovered subscription to a newly recreated subscription upon verification of resource ownership.

14. The method of claim 7, further comprising:
   synchronizing the central service with a billing system that approves subscription creation; and
   suspending any newly created subscriptions that are not included in the billing system.

15. The method of claim 7, wherein the distributed computer network enters a disaster recovery mode in response to the failure of the central service.

16. A system for recovering from a failure of a central service within a distributed computer network, comprising:
   one or more processors;
   memory in electronic communication with the one or more processors; and
   instructions stored in the memory, the instructions being executable by the one or more processors to:
      re-register a plurality of resource providers, wherein the plurality of resource providers enable consumers to create resources, and wherein the plurality of resource providers are previously registered with the central service prior to the failure of the central service;
      receive resource information and subscription information from the plurality of resource providers;
      recreate metadata records associated with the resources during recovery of the central service using the resource information and the subscription information received from the plurality of resource providers, wherein the metadata records are different from the resource information and the subscription information; and
      route, by the central service, cloud consumer requests to the plurality of resource providers that have re-registered with the central service.

17. The system of claim 16, further comprising additional instructions that are executable by the one or more processors to synchronize the metadata records at the central service with corresponding metadata records maintained by the plurality of resource providers.

18. The system of claim 16, further comprising additional instructions that are executable by the one or more processors to validate that the central service is able to communicate with the plurality of resource providers.

19. The system of claim 16, further comprising additional instructions that are executable by the one or more processors to restore the central service from a backup in response to the failure of the central service.

20. The system of claim 16, further comprising additional instructions that are executable by the one or more processors to request a service provider to initiate a manual recovery when information about a subscription is missing and the information cannot be automatically recovered.

* * * * *